(12) United States Patent
Matsuzawa et al.

(10) Patent No.: US 8,135,677 B2
(45) Date of Patent: Mar. 13, 2012

(54) FILE MANAGEMENT SYSTEM AND METHOD

(75) Inventors: Keiichi Matsuzawa, Yokohama (JP); Atsushi Sutoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 591 days.

(21) Appl. No.: 12/234,815

(22) Filed: Sep. 22, 2008

(65) Prior Publication Data

US 2010/0030825 A1    Feb. 4, 2010

(30) Foreign Application Priority Data

Jul. 29, 2008   (JP) ................................. 2008-195363

(51) Int. Cl.
*G06F 17/30* (2006.01)
(52) U.S. Cl. .................... 707/649; 707/662; 711/162
(58) Field of Classification Search .................. 707/638, 707/662, 666, 624, 610, 649, 640; 711/162, 711/161
See application file for complete search history.

(56) References Cited

U.S. PATENT DOCUMENTS

| | | | |
|---|---|---|---|
| 5,963,959 A * | 10/1999 | Sun et al. ............................. | 1/1 |
| 6,101,497 A * | 8/2000 | Ofek .............................. | 707/657 |
| 6,289,335 B1 * | 9/2001 | Downing et al. ............. | 707/769 |
| 6,748,504 B2 * | 6/2004 | Sawdon et al. ............... | 711/162 |
| 6,829,617 B2 * | 12/2004 | Sawdon et al. ........................ | 1/1 |
| 6,959,310 B2 * | 10/2005 | Eshel et al. .......................... | 1/1 |
| 7,111,014 B2 * | 9/2006 | Sawdon et al. ........................ | 1/1 |
| 7,237,076 B2 * | 6/2007 | Nakano et al. ................ | 711/162 |
| 7,254,682 B1 * | 8/2007 | Arbon ........................... | 711/161 |
| 7,334,095 B1 * | 2/2008 | Fair et al. ...................... | 711/161 |
| 7,392,357 B2 * | 6/2008 | Ebata ............................. | 711/162 |
| 7,440,966 B2 * | 10/2008 | Adkins et al. ......................... | 1/1 |
| 7,502,801 B2 * | 3/2009 | Sawdon et al. ....................... | 1/1 |
| 7,827,350 B1 * | 11/2010 | Jiang et al. ................... | 711/114 |
| 7,827,368 B2 * | 11/2010 | Ebata ............................. | 711/162 |
| 7,831,560 B1 * | 11/2010 | Spertus et al. ................ | 707/639 |

(Continued)

FOREIGN PATENT DOCUMENTS

JP     08-511367     11/1996

(Continued)

OTHER PUBLICATIONS

Minwen Ji, Instant Snapshots in a Federated Array of Bricks, Jan. 28, 2005, pp. 1-21.*

(Continued)

*Primary Examiner* — John Cottingham
*Assistant Examiner* — Sherief Badawi
(74) *Attorney, Agent, or Firm* — Antonelli, Terry, Stout & Kraus, LLP.

(57) ABSTRACT

A proposal is made of a file management system and method capable of reliably deleting unnecessary data. In a file management console and method for reading or writing data of a file from or in a first volume, which is provided by a storage device, in response to a request sent from a host computer, one snapshot or multiple snapshots that relate to the first volume and can be updated are created. In response to an externally issued designated file deletion command, a designated file is deleted from all of the first volume and snapshots or part thereof specified in the deletion command. At this time, the data items of the designated file in the first volume and/or snapshots from which the designated file should be deleted are overwritten with invalid data. Moreover, pieces of management information on the designated file are changed to a reference-disabled state.

6 Claims, 11 Drawing Sheets

U.S. PATENT DOCUMENTS

| | | | |
|---|---|---|---|
| 7,860,909 B2 * | 12/2010 | Kodama | 707/640 |
| 7,885,930 B2 * | 2/2011 | Anzai et al. | 707/639 |
| 7,941,619 B1 * | 5/2011 | Rossi | 711/162 |
| 7,949,692 B2 * | 5/2011 | Lemar et al. | 707/822 |
| 2002/0091670 A1 | 7/2002 | Hitz et al. | |
| 2003/0158834 A1 * | 8/2003 | Sawdon et al. | 707/1 |
| 2003/0158862 A1 * | 8/2003 | Eshel et al. | 707/200 |
| 2003/0159007 A1 * | 8/2003 | Sawdon et al. | 711/154 |
| 2004/0030727 A1 * | 2/2004 | Armangau et al. | 707/200 |
| 2004/0186900 A1 * | 9/2004 | Nakano et al. | 709/213 |
| 2005/0027819 A1 * | 2/2005 | Nakano et al. | 709/217 |
| 2005/0210193 A1 * | 9/2005 | Nagata | 711/114 |
| 2006/0161530 A1 * | 7/2006 | Biswal et al. | 707/3 |
| 2006/0206536 A1 * | 9/2006 | Sawdon et al. | 707/200 |
| 2007/0156984 A1 * | 7/2007 | Ebata | 711/162 |
| 2007/0156985 A1 * | 7/2007 | Tsai et al. | 711/162 |
| 2007/0226730 A1 * | 9/2007 | Coyle et al. | 717/170 |
| 2008/0177957 A1 * | 7/2008 | Lee | 711/161 |
| 2008/0235472 A1 * | 9/2008 | Ebata | 711/162 |
| 2009/0063422 A1 * | 3/2009 | Kodama | 707/3 |

FOREIGN PATENT DOCUMENTS

| | | |
|---|---|---|
| JP | 2004-342050 | 12/2004 |
| JP | 2005-301548 | 10/2005 |

OTHER PUBLICATIONS

Amelie Marian et al., Change-Centric Management of Versions in an XML Warehouse, 2001, pp. 1-10.*

Norman Hutchinson, Logical vs. Physical File System Backup, 1999, pp. 1-12.*

* cited by examiner

FILE MANAGEMENT SYSTEM AND METHOD

CROSS REFERENCES TO RELATED APPLICATIONS

This application relates to and claims priority from Japanese Patent Application No. 2008-195363, field on Jul. 29, 2008, the entire disclosure of which is incorporated herein by reference.

BACKGROUND OF THE INVENTION

1. Field of the Invention

The present invention relates to a file management system and method. More particularly, the present invention is preferably adapted to a computer that has a snapshot facility installed therein and that reads or writes file data from or in a storage area, which a storage device provides, in response to a request sent from a host computer.

2. Description of the Related Art

The features of a network attached storage (NAS) server or a disk array apparatus include a so-called snapshot feature that holds the printout of a working volume (a logical volume from or into which a user reads or writes data) designated at a time point when a snapshot creation instruction is received. The snapshot feature is used to restore the contents of the working volume, which are obtained at a time point when a snapshot is created, in a case where data disappears because of a human error or the state of a file system attained at a desired time point has to be restored.

In the past, a method of changing the position of a data storage block of a working volume, in which a file system is stored, from snapshot to snapshot (refer to a patent document 1) or a method of copying and holding inodes in a file system to and in each snapshot (refer to a patent document 2) has been proposed as a technique for realizing snapshots.

The foregoing techniques do not copy data at a time point at which a snapshot is created. At the time point at which a snapshot is created, file data is shared by a working file system and the snapshot. When the file is overwritten with data, data obtained prior to the overwriting is copied into a volume called a difference volume.

When a snapshot is referenced, data stored in a working volume is combined with a portion of file data that is not overwritten with data, or data stored in the difference volume is combined with a portion of the file data that is overwritten with the data. Thus, a printout of data in the working volume obtained at the time point at which a snapshot is created is restored. This method is called a copy-on-write (COW) method or an allocation-on-write (AOW) method.

Incidentally, a patent document 1 refers to JP-A-2004-342050, a patent document 2 refers to JP-T-8-511367, and a patent document 3 refers to JP-A-2005-301548.

In recent years, a risk that a corporate entity or the like keeps holding unnecessary data has become controversial from the viewpoint of protecting personal information or preventing fraudulent access. The necessity of a feature for reliably deleting unnecessary data is increasing.

Normally, an unnecessary file is deleted by instructing a file system to delete the file via a file deletion interface supported by an operating system (OS).

In this case, when some file systems are instructed to delete a file, they do not delete file data itself but deletes only metadata that is management information on the file. When the metadata is deleted, a user cannot refer the data of the file that is an object of deletion. The file looks like being deleted.

However, according to the above method, data remains undeleted in a working volume in which the file system is stored. When information preserved in the working volume is directly accessed without intervention of the file system, the data of the file that is supposed to be deleted can be read out.

As general measures against the foregoing problem, a technique of overwriting data of a file with invalid data and issuing a deletion instruction relevant to the file to the file system has been proposed. In this case, as a standard rule concerning the contents of data to be used for overwriting and the number of times of overwriting, a rule recommended by the U.S. National security Agency (NSA) or a provision (DoD5200.22-M) stipulated by Pentagon can be adopted. Moreover, a method of controlling an overwriting timing so as to prevent fraudulent reading has been disclosed in the patent document 3.

However, when the foregoing method is adapted to a file system having a snapshot facility, there is a problem. Even when a certain file is deleted from the file system, the same file data may remain in a previous snapshot. Therefore, a technique of deleting all data items of a file, which is designated by a user, including file data items contained in snapshots is needed.

In a file system in which a previous snapshot cannot be modified, file data in a snapshot cannot be deleted, that is, an underlining problem cannot be solved. However, in a file system having a rewritable snapshot facility, file data in a snapshot can be detected.

SUMMARY OF THE INVENTION

The present invention addresses the foregoing problem, and is intended to propose a file management system and method capable of reliably deleting unnecessary data.

In order to accomplish the foregoing intention, according to the present invention, a file management system that is connected to a storage device and that reads or writes file data from or in a first volume, which is provided by the storage device, in response to a request sent from a host computer includes: a snapshot creating unit that creates one snapshot or multiple snapshots which can be updated and relate to the first volume; and a file deleting unit that, in response to an externally issued designated file deletion command, deletes a designated file from all of the first volume and snapshots or part thereof specified in the deletion command. The file deleting unit overwrites the data of the designated file in the first volume and/or the snapshots, from which the designated file should be deleted, with invalid data, and changes pieces of management information on the designated file to a reference-disabled state.

Moreover, according to the present invention, a file management method for reading or writing data of a file from or in a first volume, which is provided by a storage device, in response to a request sent from a host computer includes: a first step of creating one snapshot or multiple snapshots which can be updated and relate to the first volume; and a second step of, in response to an externally issued designated file deletion command, deleting a designated file from all of the first volume and snapshots or part thereof specified in the deletion command. At the second step, the data items of the designated file in the first volume and snapshots, from which the designated file should be deleted, are overwritten with invalid data, and pieces of management information on the designated file are changed to a reference-disabled state.

According to the present invention, a file management system and method capable of reliably deleting unnecessary data can be realized.

DESCRIPTION OF THE PREFERRED EMBODIMENTS

Figure 1:
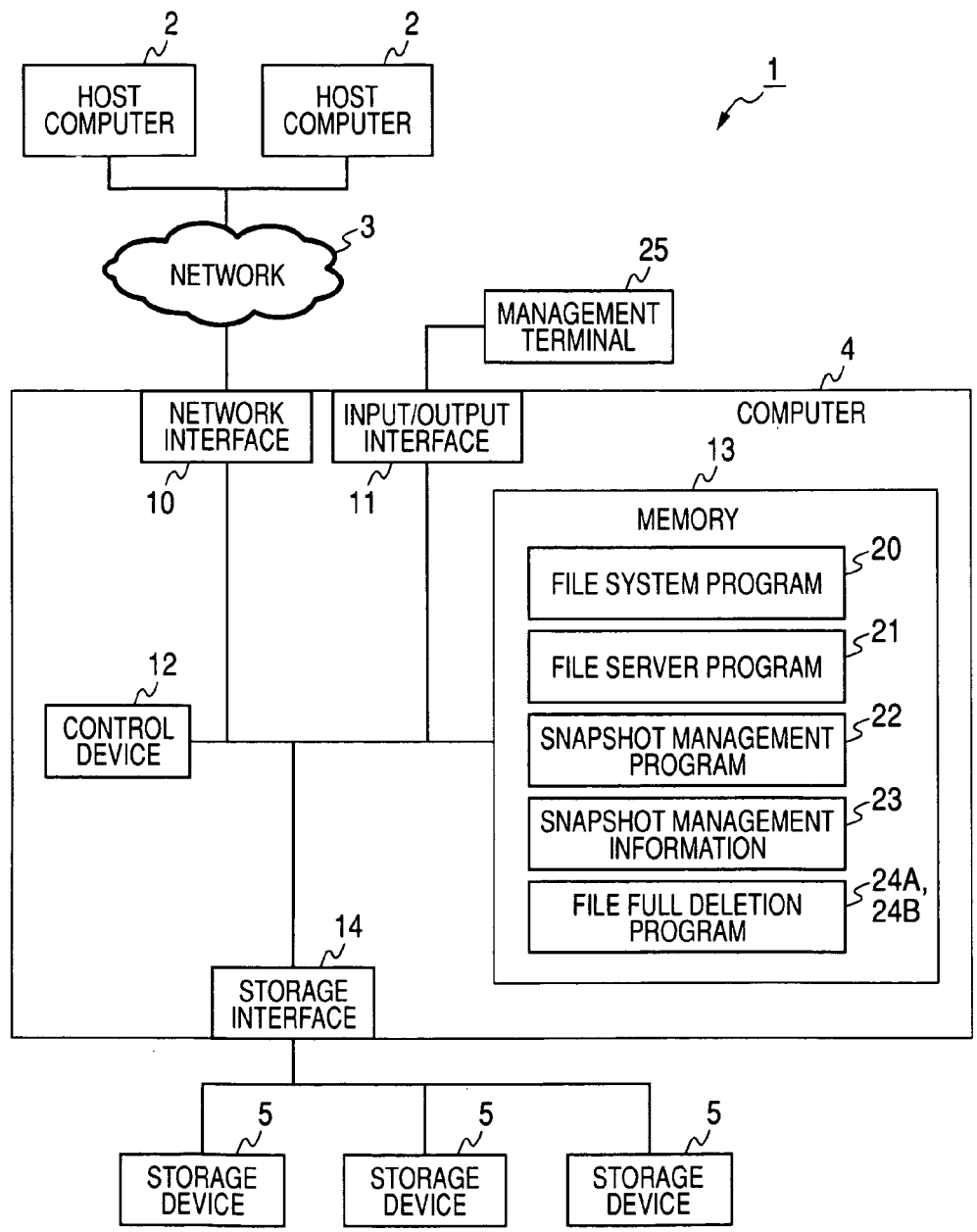
FIG. 1 is a block diagram showing the overall configuration of a storage system in accordance with an embodiment.

Referring to the drawings, embodiments of the present invention will be described below.

(1) First Embodiment

(1-1) Configuration of a Storage System in Accordance with the Present Embodiment In FIG. 1, there is as a whole shown a storage system 1 in accordance with the present embodiment. The storage system 1 has multiple host computers 2 connected to a computer 4 over a network 3, and has multiple storage devices 5 connected to the computer 4.

The host computers 2 are computer systems each including a central processing unit (CPU) and information processing resources including a memory, and each have a communication interface through which the host computer communicates with the computer 4 over the network 3.

The network 3 is, for example, a local area network or the Internet. The communication among the host computers 2 and the computer 4 over the network 3 is achieved according to a transmission control protocol/Internet protocol (TCP/IP) As a protocol according to which the host computers 2 manipulate files over the network 3, a Network File System (NFS) protocol or a Common Internet File System (CIFS) protocol is adopted.

The storage devices 5 are, for example, magnetic disks such as hard disk drives (HDDs), optical disks such as digital versatile disks (DVDs), tape devices, or flash memories. As the storage devices 5, disk array apparatuses each including multiple HDDs and a control device may be adopted. A logical volume is created in a storage area provided by each of the storage devices 5 (hereinafter, called a logical volume). Data is read or written from or in the logical volume by each of the host computers 2 in units of a block of a predetermined size.

In the present embodiment, one file system is stored in one logical volume. In general, one logical volume corresponds to one storage device 5. A logical volume manager (LVM) that produces one logical volume from multiple storage devices 5 or a partition technology for allowing one storage device 5 to manage multiple volumes may be employed.

The computer 4 includes a network interface 10, an input/output interface 11, a control device 12, a memory 13, and a storage interface 14. The computer 4 is connected to the storage devices 5 over, for example, a storage area network (SAN), and communicates the storage devices 5 through a storage interface 14 so as to acquire information required for constructing a file system.

The control device 12 is a processor responsible for control of the operation of the entire computer 4, and is formed with, for example, a central processing unit (CPU). The memory 13 is used to temporarily store data to be inputted or outputted from or to any of the storage devices 5. Moreover, various programs and necessary information such as a file system program 20, a file server program 21, a snapshot management program 22, snapshot management information 23, and a file full deletion program 24A are stored in the memory 13.

The file system program 20 is a program for providing a service of permitting a user of the computer 4 to preserve or reference data in a file format. The file server program 21 is a program allowing the computer 4 to function as a file server. The snapshot management program 22 is a program for creating and managing a snapshot. The snapshot management information 23 includes various pieces of information on snapshots managed by the snapshot management program 22. The file full deletion program 24A is a program for executing file deleting processing in accordance with the present embodiment to be described later.

A management terminal 25 formed with, for example, a personal computer is connected through the input/output interface 11. The management terminal 25 includes an information input device such as a keyboard, switches, a pointing device, and/or a microphone, and an information output device such as a monitor display and/or a loudspeaker. A user of the computer 4 can perform manipulations, which include creation, deletion, reference, and change, on files, which are managed by the computer 4, via the management terminal 25.

Moreover, when the computer 4 includes the network interface 10, if the control device 12 operates according to the file server program 21, the host computers 2 connected through the network interface 10 can perform file manipulations, which include creation, deletion, reference, and change, on files, which are managed by the computer 4, over the network 3.

(1-2) Working Example of a File System Having a Snapshot Facility

Figure 2:
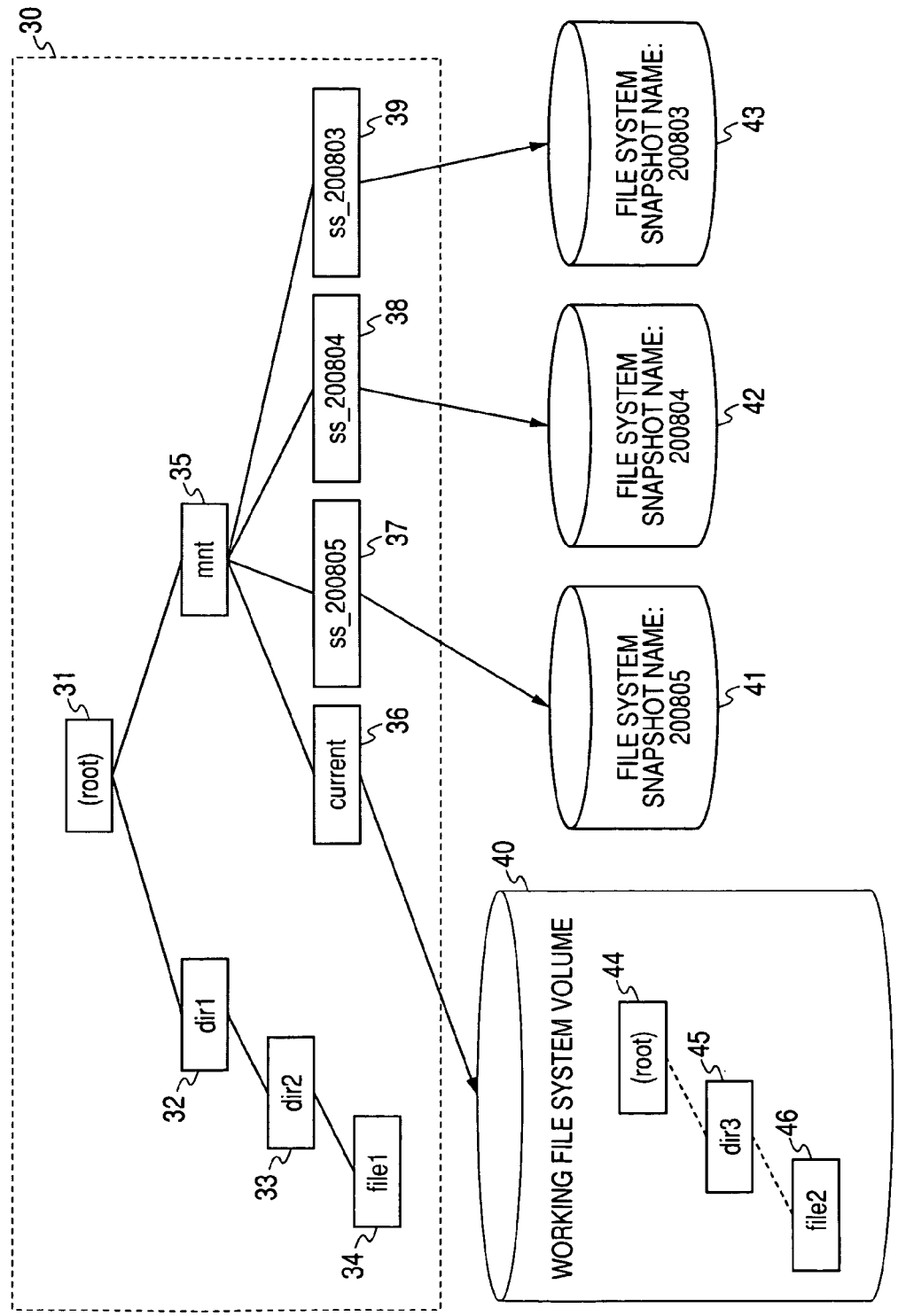
FIG. 2 is a block diagram showing a working example of a file system having a snapshot facility.

FIG. 2 shows a working example of a file system having a snapshot facility. A file tree 30 is a tree structure representative of a group of files managed by the computer 4. For example, when a specific file or directory in the file tree 30 must be referenced, a desired file or directory can be designated by concatenating any of names of leaf nodes 32 to 39, which are subordinate to a root node 31 (root) that is the root of the file tree 30, using a path delimiter (/). For example, for designating a filename file1 (node 34), a character string having the names of the three nodes 32, 33, and 34 in the file tree 30 concatenated, that is, "/dir1/dir2/file1" is employed.

A file tree of any other file system can be linked to a file that has a directory attribute and that is defined in the file tree 30. This processing is called mounting. For example, when the node 36 named "current" has the directory attribute, other file system 40 can be mounted at the node 36.

In this case, a file in the file system 40 can be identified by concatenating a character string "/mnt/current," which designates the directory at which the file system 40 is mounted, and a character string designating the file in the file system 40, that is, an object of reference. For example, when a file that is an object of reference is a file named file2 and included in the file system 40, the file file2 can be designated with a character string "/mnt/current/dir3/file2" having a character string "/mnt/current," which indicates the directory (current) at the position in the file tree 30 at which the file system 40 is mounted, and a character string "/dir3/file2," which indicates the file file2 in the file system 40, concatenated.

Previous snapshots 41 to 43 in the file system 40 can be mounted in the same manner as the file system 40 can. As for a file in the file system 40, if file data existent at the time point at which any of the previous snapshots 41 to 43 is created must be referenced, the data can be referenced using a character string indicating links to a directory at a position at which any of the previous snapshots 41 to 43 that must be referenced is mounted, and the name of the snapshot defined in the file tree of the file system 40. For example, for referencing data of a file named file2 and included in the file system 40 which is obtained at the time point at which the snapshot 41 named 200805 is created, the data can be designated with a character string "/mnt/ss_200805/dir3/file2" that has a character string "/mnt/ss_200805," which designates a directory 37 at which the snapshot 41 is mounted, and a character string "dir3/file2," which designates the file file2 included in the file system 40, concatenated.

(1-3) Interface to be Used for File Deletion

Figure 3:
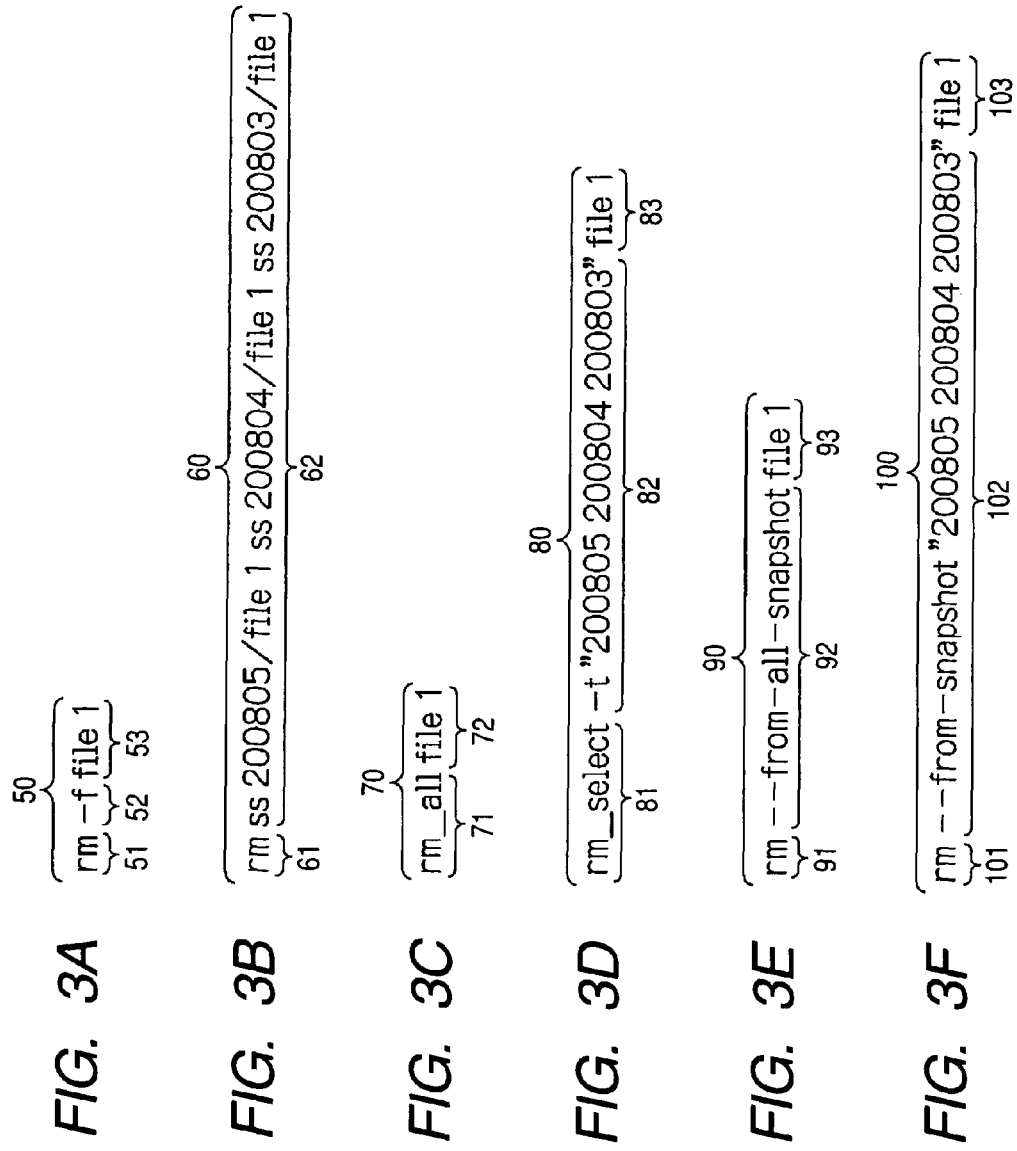
FIGS. 3A to 3F show constructional examples of a file deletion command employed in the embodiment.

FIG. 3 shows examples of an interface which a user uses to delete a file. A user can command deletion of a desired file by inputting a command, which is realized with a character string, to the management terminal 25.

A command 50 shown in FIG. 3A has a typical command format that is employed in deletion of a file and that is stipulated in the portable operating system interface (POSIX) standard or the like. The command 50 includes a command name division 51 signifying file deletion, and a filename aggregate division 52 that is an aggregation of filenames of files that are objects of deletion. Moreover, when a special manipulation must be performed during file deletion, an optional division 53 signifying an option may be included in the command 50. For example, in the case of FIG. 3A, an option specified with "-f" signifies that a user's permission is not needed for file deletion. The filenames of multiple files that are objects of deletion may be sequentially specified in the filename aggregate division 52.

However, assuming that the command 50 is employed, a file whose filename is specified in the filename aggregate division 52 can be deleted from the file system at the time point when the command is inputted. However, the file cannot be deleted from a snapshot.

As a method of deleting a file from a snapshot using a command name of rm, a method using a command 60 shown in FIG. 3B is taken for instance. For example, assuming that a snapshot created in May, 2008 is stored in a directory named "ss_200805" in the file system and a directory name for a snapshot is inferred from the year and month of creation of the snapshot, the command 60 shown in FIG. 3B may be used to delete a file file1 from each snapshot.

In the command 60, directory names for respective snapshots (ss_200805, ss_200804, and ss_200803) and a filename of an object of deletion (file1) are concatenated and successively specified in the filename aggregate division 52 of the command 50 shown in FIG. 3A in which objects of deletion are specified. Thus, the file file1 can be deleted from each of the snapshots.

However, when the number of snapshots is large, the command 60 gets long. Therefore, since some computers have limitations on the maximum length of a command, all snapshots may not be able to be designated. Moreover, a file that is an object of deletion cannot be deleted from a snapshot that does not have a directory therefor made public.

In the present embodiment, as new commands that use the command name rm and are used to delete a file, which is an object of deletion, from each snapshot, commands shown in FIGS. 3C and 3D are proposed.

FIG. 3C shows a constructional example of a command 70 that instructs deletion of a file, which has a filename thereof (herein, file1) specified in a filename aggregate division 72, from all relevant snapshots. The command 70 has a command name (rm_all), which is different from the command name (rm) of the command 50 for file deletion shown in FIG. 3A, specified in a command name division 71. Moreover, the command 70 has the command name division 71 succeeded by a filename aggregate division 72. Filenames of files that are objects of deletion are specified in the filename aggregate division 71b. When the command 70 is issued, the computer 4 instructs the storage devices 5 to delete files, of which filenames are specified in the filename aggregate division 72, from all relevant snapshots in the file system and snapshot facility.

Incidentally, filenames to be specified in the filename aggregate division 72 may not always be names formed with character strings but may be symbols with which files can be uniquely identified. For example, an inode number or a hash value caused by entry of data may be adopted as a filename to be specified in the filename aggregate division 72.

FIG. 3D shows a constructional example of a command 80 that instructs deletion of a file, which is an object of deletion, from a designated snapshot. In the command 80, a command name rm_select specified in a command name division 81 signifies that files whose filenames are specified in a filename aggregate division 83 should be deleted from a group of snapshots designated in an optional division 82. As a method of designating snapshots using the optional division 82, a method of specifying, aside from names of snapshots, dates of creation of snapshots or a conditional formula with which snapshots can be identified, for example, "snapshots created during a period from February, 2008 to April, 2008" can be adopted.

In the commands 70 and 80 shown in FIGS. 3C and 3D, command names (rm_all and rm_select) different from a command name (rm) employed in a typical command format are utilized. As another working mode, an option designating snapshots may be appended to the existing command name (rm).

FIGS. 3E and 3F show constructional examples of commands employing the existing command name (rm). (FIG. 3E shows a format in which an optional name (--from-all-snapshot) signifying that files whose filenames are specified in a filename aggregate division 93 should be deleted from all relevant snapshots is specified in an optional division 92. Moreover, FIG. 3F shows a format in which an optional name (--from-snapshot"200805 200804 200803") signifying that files whose filenames are specified in a filename aggregate division 93 should be deleted from snapshots whose names are specified in an optional division 102 is specified in the optional division 102. A command 90 instructs the same processing as the command 70 does, and a command 100 instructs the same processing as the command 80 does.

As mentioned above, when the new command name (rm_al or rm_select) is substituted for the existing command name (rm) or the new option (--from-all-snapshot or --from-snapshot"200805 200804 200803") is introduced in combination with the existing command name, a user can easily delete files from snapshots.

Figure 4:
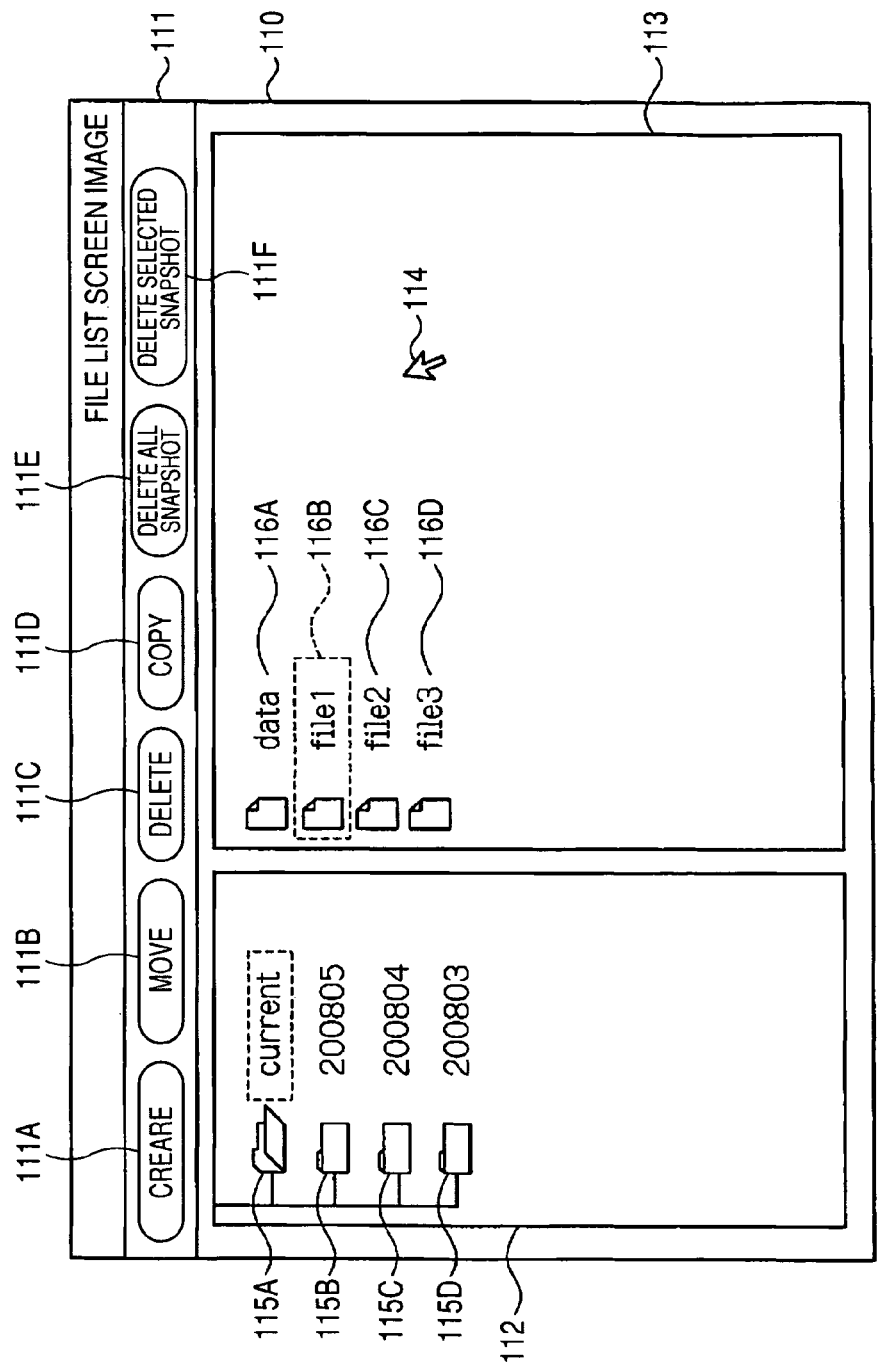
FIG. 4 shows a constructional example of a file list screen image.
Figure 5:
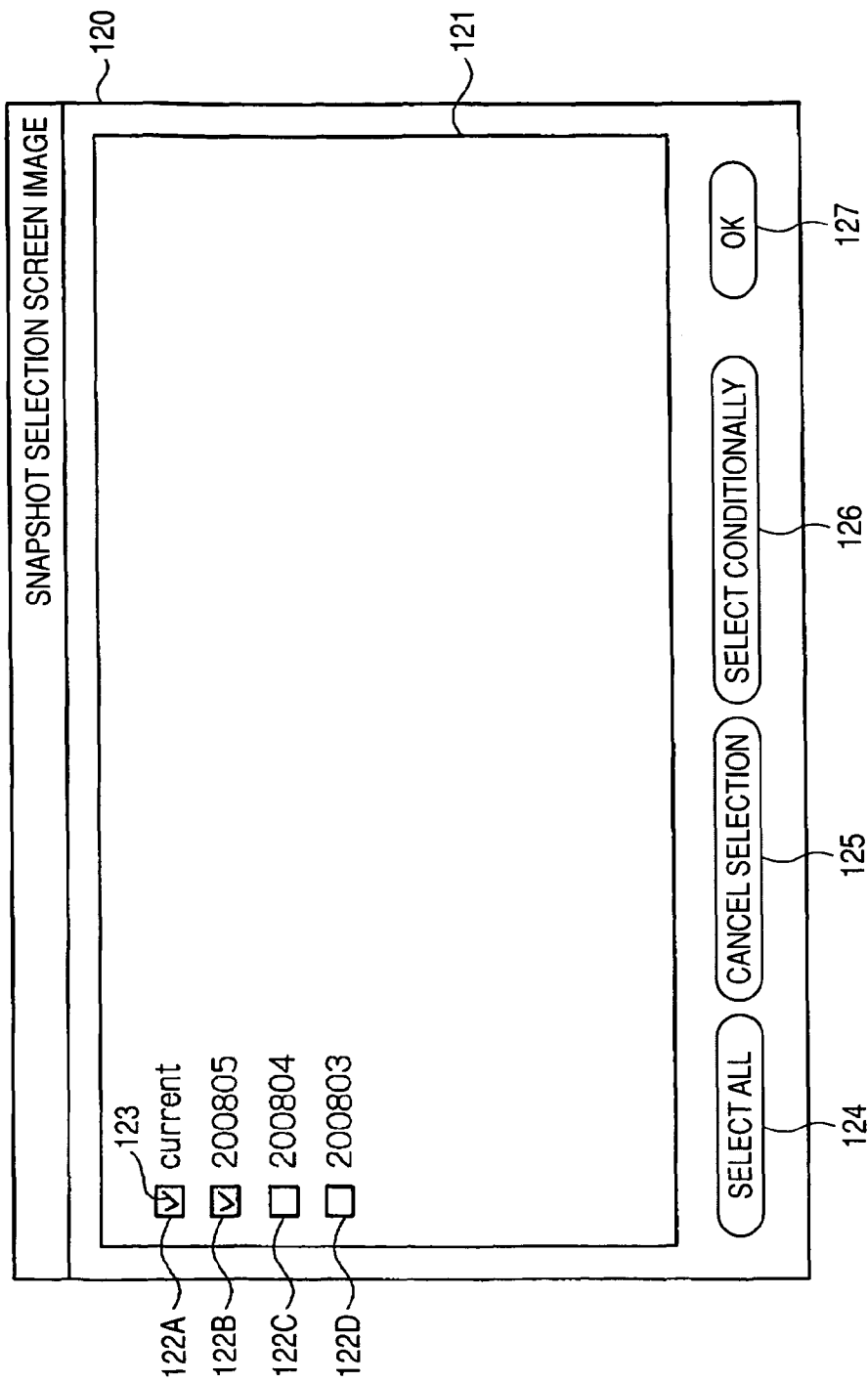
FIG. 5 shows a constructional example of a snapshot selection screen image.

FIG. 4 and FIG. 5 show constructional examples of a graphical user interface (GUI) to be displayed on, for example, the management terminal 25. The command user interface (CUI) described in conjunction with FIG. 3 allows a user to input a command so as to command deletion of files. In contrast, in the GUI environment like the ones shown in FIG. 4 and FIG. 5, a user need not enter characters but can command deletion of files.

For example, FIG. 4 shows an example of a GUI through which files are deleted. A file list screen image 110 shown in FIG. 4 is composed of a group of file manipulation buttons 111, a directory list 112, and a file list 113. A user manipulates a mouse, which is not shown, of the management terminal 25 to move a mouse pointer 114 so as to designate a file that is an object of manipulation or designate a manipulative content. In the field of the directory list 112, icons 115A to 115D indicating multiple directories are displayed.

A user moves the mouse pointer 114 so as to designate any of the icons 115A to 115D, and thus inputs a selective instruction so as to select a desired directory. At this time, in the field of the file list 113, filenames 116A to 116D of files contained in the directory selected from the directory list 112 are displayed. The user moves the mouse pointer 114 so as to select one desired filename or multiple desired filenames from among the filenames 116A to 116D. Thereafter, the user clicks in any of the buttons 111A to 111F of the group of file manipulation buttons 111, and thus can manipulate the file.

Out of the group of file manipulation buttons 111, a creation button 111A, a movement button 111B, a deletion button 111C, and a copy button 111D are conventionally used buttons. When the deletion button 111C is clicked, a file selected from the group of files displayed in the field of the file list 113 can be deleted. If the directory selected from the directory list 112 has a previous snapshot mounted thereat, the file in the snapshot is also deleted. In any case, what is deleted by clicking the deletion button 111c is only a file in one snapshot out of multiple snapshots.

In the case of the file list screen image 110 employed in the present embodiment, the group of file manipulation buttons 111 includes a comprehensive deletion button 111E and a selective deletion button 111F. In the file list screen image 110, the mouse pointer 114 is moved to select a file that is an object of deletion, and the comprehensive deletion button 111E is clicked. Thus, the selected file that is an object of deletion can be deleted from all snapshots.

Moreover, in the file list screen image 110, after a file that is an object of deletion is selected from the file list 113, when the selective deletion button 111F is clicked, a snapshot selection screen image 120 like the one shown in FIG. 5 is displayed.

The snapshot selection screen image 120 is a screen image for use in selecting snapshots from which a file that is an object of deletion is deleted, and includes a snapshot list 121. In the field of the snapshot list 121, snapshot names of snapshots containing a file that is an object of deletion, and check boxes 122A to 122D associated with the snapshot names are displayed. A user clicks in check boxes associated with desired snapshots out of the check boxes 122A to 122D so that a check mark 123 will be displayed in the clicked check boxes. Thus, the snapshots can be selected as snapshots from which the file that is an object of deletion is deleted.

Moreover, in the snapshot selection screen image 120, an all selection button 124, a selection cancel button 125, and a conditional sentence button 126 are also displayed. A user uses the all selection button 124, selection cancel button 125, and conditional sentence button 126 to easily select snapshots from which a file that is an object of deletion is deleted.

For example, in the snapshot selection screen image 120, when the all selection button 124 is clicked, all snapshots whose snapshot names are listed in the snapshot list 121 can be selected (the check mark 123 is displayed in all the check boxes 122A to 122D).

Moreover, in the snapshot selection screen image 120, when the selection cancel button 125 is clicked, selection of all snapshots is canceled (the check marks 123 displayed in the check boxes 122A to 122D are deleted).

In the snapshot selection screen image 120, when the conditional sentence button 126 is clicked, a conditional sentence can be entered. For example, a conditional character string to be specified in the optional division 82 of the command 80 described in conjunction with FIG. 3D can be entered.

In the snapshot selection screen image 120, after snapshots from which a file that is an object of deletion should be deleted are selected as mentioned above, when an OK button 127 is clicked, selection of the snapshots is finalized. At this time, a command signifying that the file selected in the file list screen image 110 should be deleted from the snapshots selected in the snapshot selection screen image 120 (for example, any of the commands shown in FIGS. 3C to 3F) is issued from the management terminal 25 to the computer 4.

(1-4) File Deleting Processing in the Present Embodiment

Figure 6:
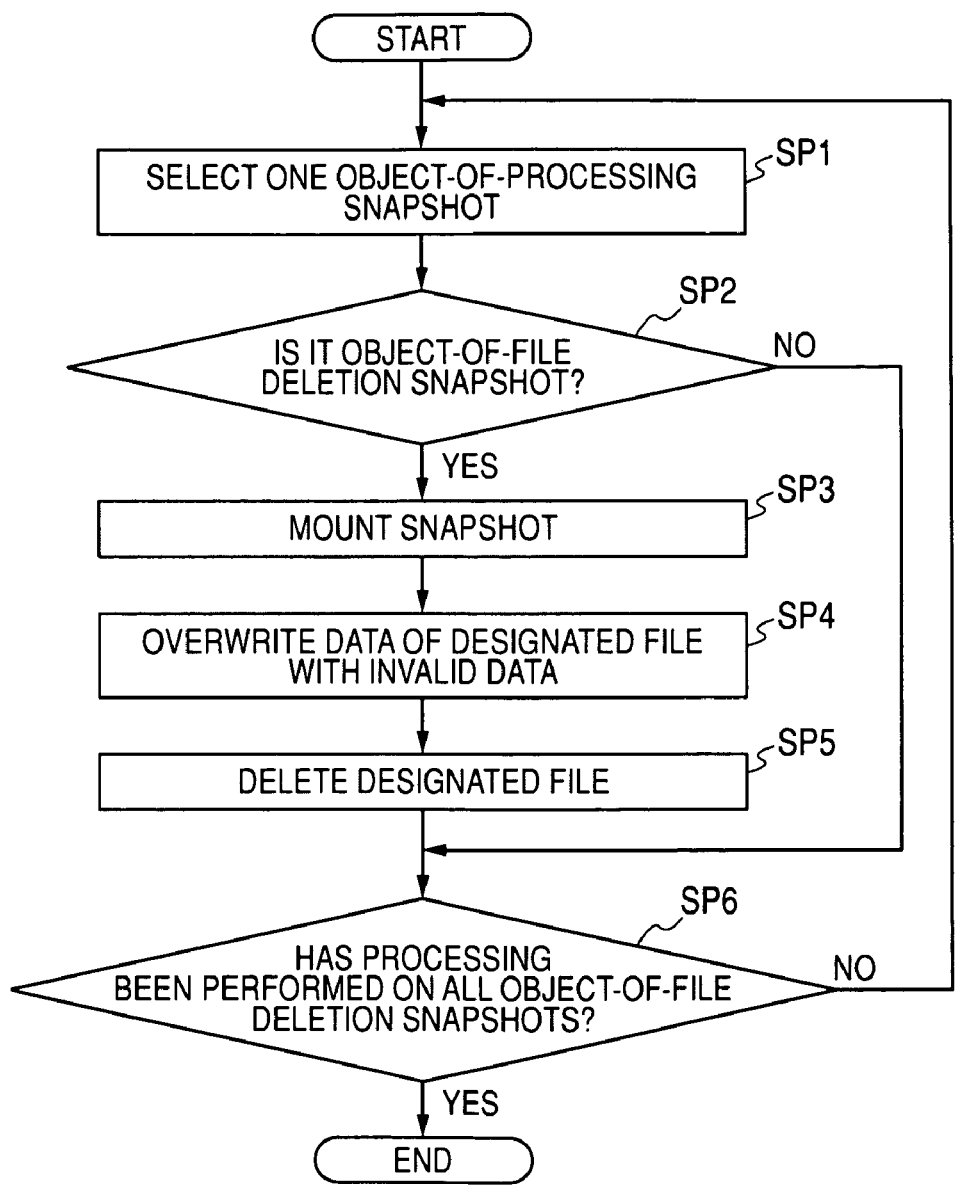
FIG. 6 is a flowchart describing a procedure of first file deleting processing.

FIG. 6 shows the contents of processing to be performed by the control device 12 in a case where any of the commands 70, 80, 90, and 100 shown in FIGS. 3C to 3F is issued from the management terminal 25 to the computer 4. The control device 12 executes first file deleting processing described in FIG. 6 according to a file full deletion program 24A stored in the memory 13.

Specifically, when any of the commands 70, 80, 90, and 100 is issued, the control device 12 first selects one file system or snapshot, which is an object of processing (and will be called an object-of-processing snapshot), from among a working file system and all snapshots of the working file system (SP1).

Thereafter, the control device 12 decides whether the object-of-processing snapshot has been selected as a snapshot from which a file designated as an object of deletion with the command 70, 80, 90, or 100 (which will be called a designated file) should be deleted (which will be called an object-of-file deletion snapshot) (SP2).

If the control device 12 decides in the negative, the control device 12 proceeds to step SP6. In contrast, if the control device 12 decides in the positive at step SP2, the control device 12 mounts the object-of-processing snapshot in the file system (SP3). If the object-of-processing snapshot is the working file system, this step is skipped.

Thereafter, the control device 12 overwrites the designated file in the object-of-processing snapshot with invalid data (for example, all 0s) (SP4). At this time, as a standard rule concerning the contents of the invalid data with which the file is overwritten or the number of times of overwriting, a rule recommended by the National Security Agency (NSA) or a provision stipulated by Pentagon (DoD5200.22-M) can be adopted.

Thereafter, the control device 12 deletes the designated file from the object-of-processing snapshot by updating metadata on the designated file to a reference-disabled state (SP5). As a method of updating metadata to the reference-disabled state, a method of overwriting the metadata with invalid data can be adopted.

Thereafter, the control device 12 decides whether the processing from step SP2 to step SP5 has been executed for the working file system and all relevant snapshots or file systems (SP6).

If the control device 12 decides in the negative, the control device 12 returns to step SP1. Thereafter, the control device 12 repeats the same processing while changing the object-of-processing snapshot, which is selected at step SP1, to any other relevant snapshot.

If the control device 12 decides in the affirmative at step SP6 because having completed performing the same processing on the working file system and all relevant file systems, the control device 12 terminates the first file deleting processing.

When the command 50 described in conjunction with FIG. 1 is issued, some existing file systems merely manipulate metadata that is management information on a file and appends a mark signifying that the file has been deleted, but does not modify the file data itself.

Even in the foregoing conventional method, since the working file system treats a designated file as a deleted file, if an attempt is made to reference the designated file through the working file system, the designated file cannot be referenced. According to this method, a file can be deleted by merely manipulating metadata. The method has the merit that a file can be deleted fast.

However, the conventional method has a drawback that when data in any of the storage devices 5 is directly referenced without interference of a file system, the data of a file that is supposed to be deleted (designated file) can be referenced.

In order to prevent the above incident, according to the present embodiment, the data of a designated file is overwritten with invalid data in order to reliably delete the data from an object-of-processing snapshot.

(1-5) Advantage of the Present Embodiment

As mentioned above, according to the present embodiment, since both data of a designated file and metadata are modified, data obtained prior to deletion cannot be referenced. Hereinafter, disabling data, which is obtained prior to deletion, from being referenced will be called full deletion of a file.

In the method of file deleting processing employed in the present embodiment, linkage among a working file system and relevant snapshots is unnecessary. For example, mounting a snapshot at step SP3 is achieved by a feature of a snapshot facility. Overwriting or deleting data of a designated file at step SP4 or SP5 is achieved by a feature of a file system. The features are utilized independently of each other. The method can therefore be said to be a highly versatile method.

(2) Second Embodiment

To begin with, a snapshot facility utilizing a copy-on-write (COW) technology disclosed in the cited document 1 will be described below. The snapshot facility can, as shown in, for example, FIG. 7, create multiple snapshots (200803, 200804, and 200805) from a working file system stored in a working volume 130. The created snapshots are associated with different virtual logical volumes (hereinafter, called virtual volumes) 131 to 133.

Figure 7:
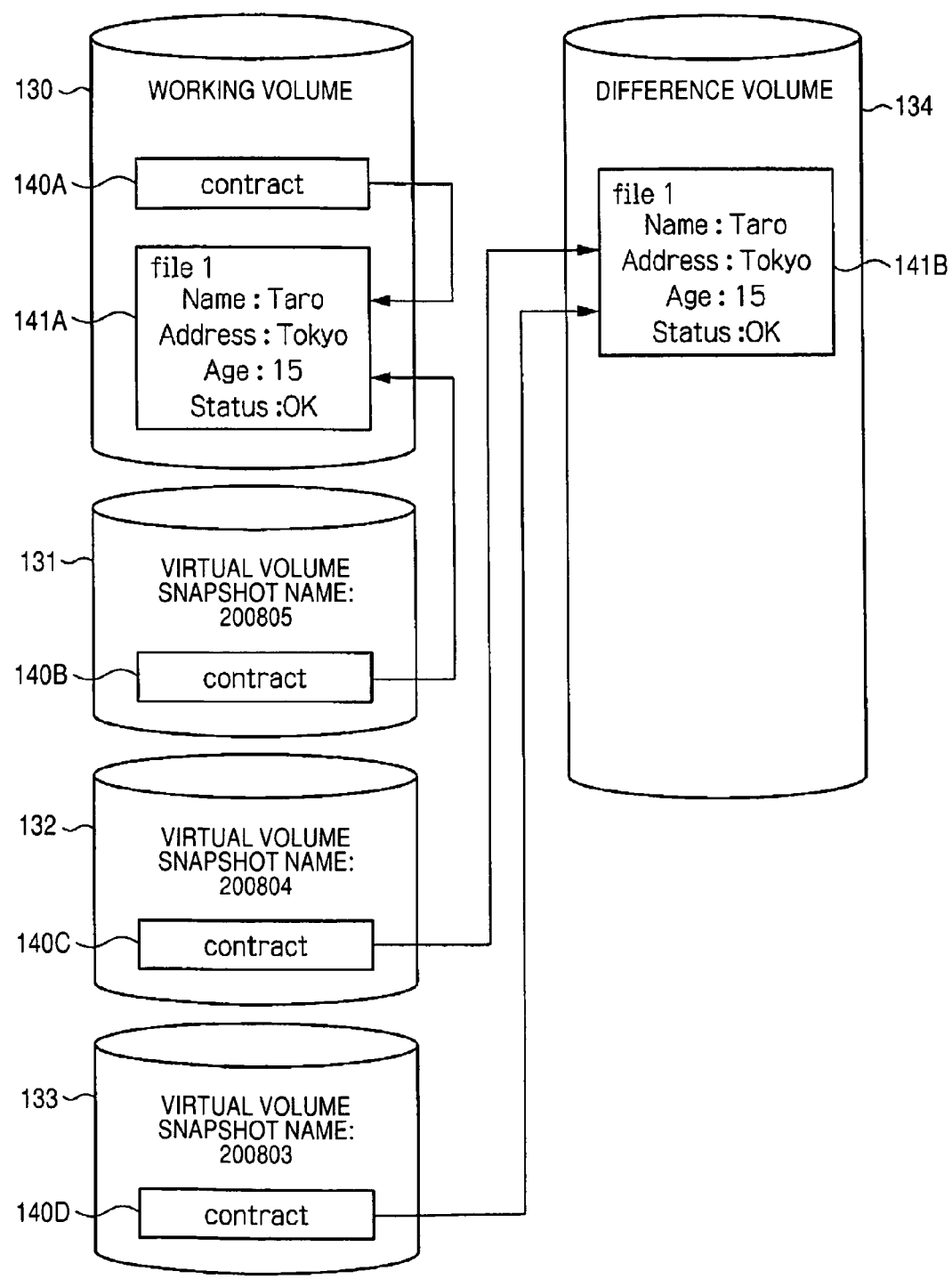
FIG. 7 is a conceptual diagram showing working examples of a file system and snapshots.

When a snapshot is created, the position of data of each file existent in the snapshot in any of the virtual volumes 131 to 133, which is specified in metadata on the file, is the stored position in the working volume 130 at which the data 141A of the file is stored. If any file in the working file system is updated, the data 141B of the file obtained immediately prior to the updating is saved into a difference volume 134 through COW processing. The position of the data of the file specified in metadata items 140A to 140D on the file existent in the virtual volumes 132 and 133 associated with the snapshots which have been created by the time point are changed to the stored position of the file data 141B in the difference volume 134 into which the file data 141B is saved. Consequently, FIG. 7 shows a state in which a file file1 is updated during a period from the instant when a snapshot 200804 is created to the instant when a snapshot 200805 is created.

Likewise, when a file shared by snapshots is updated, the data of the file obtained prior to the updating is saved into the difference volume 134 through COW processing. For example, in FIG. 7, the snapshots named 200804 and 200803 respectively share the data of a file named file1 and stored in the difference volume 134. When the file file1 in the snapshot 200804 is updated, the data of the file file1 obtained prior to the updating is copied into the difference volume 134. The position of the data of the file specified in metadata 140D on the file file1 in the snapshot 200803 is updated to the position in the difference volume 134 of the data of the file file1 that is obtained prior to the updating and copied into the difference volume 134.

According to the method of file deleting processing employed in the first embodiment, even when the snapshot facility installed in the computer 4 is a snapshot facility that utilizes the COW technology, full deletion of a designated file can be achieved. However, executing the file deleting processing in the snapshot facility poses a problem described below.

For example, assume that a file having a filename of file1 has existed in a file system. In this case, the working file system and relevant snapshots hold metadata items 140A to 140D on the file file1.

After the snapshots 200804 and 200803 are created, if the file file1 is updated, the working file system and the snapshot 200805 reference the same data 141A on the file file1. The position of the data of the file file1 specified in the metadata 140A in the working file system, and the position of the data of the file specified in the metadata 140B in the snapshot 200805 are the stored position of the data 141A that is the data of the file file1 held in the working file system.

On the other hand, a referencing destination of a designated file specified in the metadata 140C held in the snapshot 200804 and the metadata 140D held in the snapshot 200803 is the data 141B of the file file1 saved into the difference volume 134.

Figure 8:
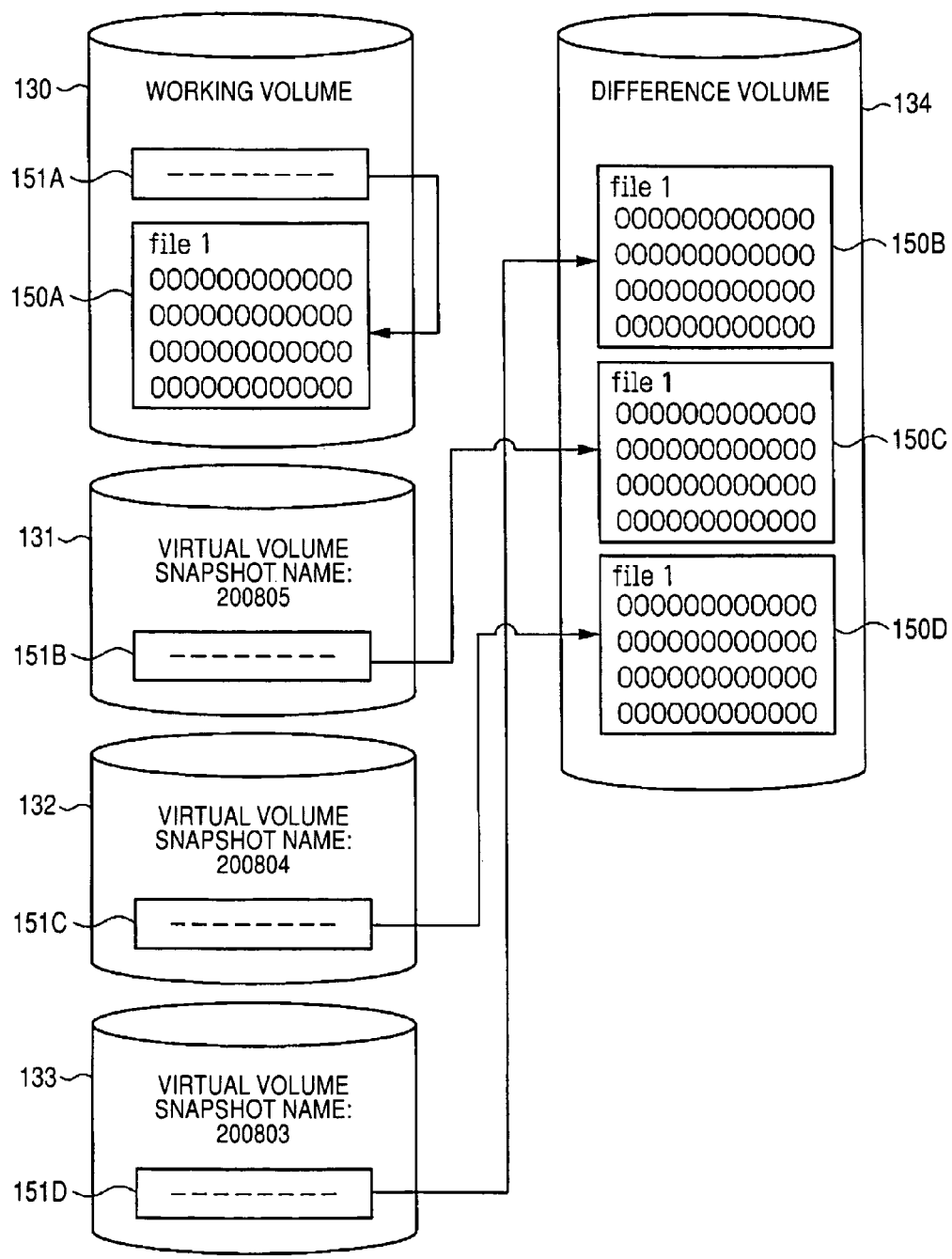
FIG. 8 is a conceptual diagram showing working examples of the file system and snapshots having undergone the first file deleting processing.

FIG. 8 shows the results of execution of the file deleting processing that is described in conjunction with FIG. 6 and executed in order to delete a file file1 from a working file system and all relevant snapshots. In the file deleting processing, the control device 12 performs a loop from step SP1 to step SP6 on the working file system, the snapshot 200805, the snapshot 200804, and the snapshot 200803 in that order.

In this case, the metadata items 140A and 140B in FIG. 7 specify the data 141A, which is stored in the working volume 130, as a referencing destination of a designated file. When the processing of step SP4 in FIG. 6 is executed for the working file system, the data 141A that is the referencing destination of the designated file specified in the metadata 140B is saved into the difference volume 134 due to the COW feature (data 150C in FIG. 8). The data 141A in the working volume 130 is overwritten with invalid data through the processing of step SP4 in FIG. 6 (data 150A in FIG. 8). Moreover, the metadata 140A is updated to a reference-disabled state through the processing of step SP5 in FIG. 6 (metadata 151A in FIG. 8).

Thereafter, the control device 12 performs the loop from step SP1 to step SP6 in FIG. 6 on the snapshot 200805. In this case, the data 141A that is the referencing destination of the designated file specified in the metadata 140B is already saved into the difference volume 134 through the processing of step SP4 (data 150C in FIG. 8), and the data 150C is overwritten with invalid data through the processing of step SP4 in FIG. 6 which is performed on an object-of-processing snapshot (snapshot 200805). The metadata 140B is updated to the reference-disabled state through the processing of step SP5 in FIG. 6 (metadata 151B in FIG. 8).

Likewise, the control device 12 performs the loop from step SP1 to step SP6 on the snapshot 200804. Since the metadata items 140A and 140D specify as the referencing destination of the designated file the data 141B saved into the difference volume 134, when the processing of step SP4 in FIG. 6 is executed for the snapshot 200804, the data 141B that is the referencing destination of the designated file specified in the metadata 140C is saved into the difference volume 134 due to the COW feature (data 150D in FIG. 8). The data 150D is overwritten with invalid data through the processing of step SP4 in FIG. 6. The metadata 140C is updated to the reference-disabled state through the processing of step SP5 in FIG. 6 (151C in FIG. 8).

Finally, the control device 12 performs the loop of step SP1 to step SP6 in FIG. 6 on the snapshot 200803. The data 150B that is the referencing destination of the designated file specified in the metadata 140B during the processing of step SP4 performed on the snapshot 200804 is already saved into the difference volume 134 (data 150D in FIG. 8). Since the data 141B is specified as the referencing destination of the designated file in the metadata 140D alone, copying processing based on the COW feature is not performed during the processing of step SP4 in FIG. 6 that is performed on the object-of-processing snapshot (snapshot 200803). The data 141B is overwritten with invalid data (data 150B in FIG. 8). The metadata 140D is updated to the reference-disabled state through the processing of step SP5 in FIG. 6 (data 151D in FIG. 8).

Before the file file1 (designated file) is deleted, the data 141A in the working volume 130 and the data 141B in the difference volume 134 exist, as shown in FIG. 7, as the data items of the file. However, after the file deleting processing in FIG. 6 is executed, the data 150C and data 150D also exist, as shown in FIG. 8, in the difference volume 134.

Although deletion of a file is the processing of deleting unnecessary information, if the conventional file deleting processing described in conjunction with FIG. 6 is adapted to a snapshot facility that utilizes the COW technology, the storage capacity of the difference volume 134 is unnecessarily consumed. Moreover, the adaptation poses a problem in that it takes much time to perform full deletion which includes copying processing of data based on the COW feature and overwriting of a designated file in each of relevant snapshots with invalid data.

Figure 9A:
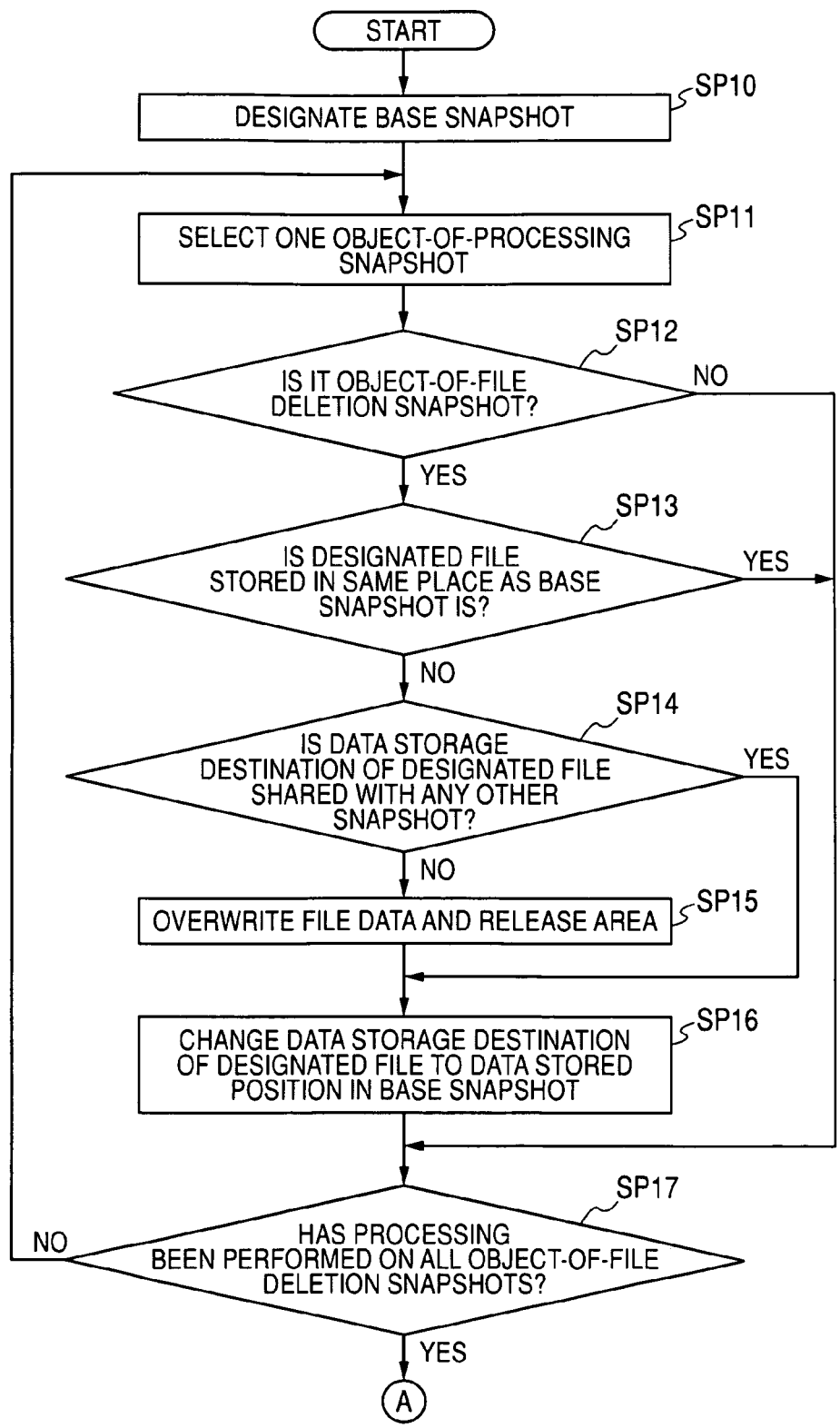
FIG. 9A is a flowchart describing the procedure of second file deleting processing.
Figure 9B:
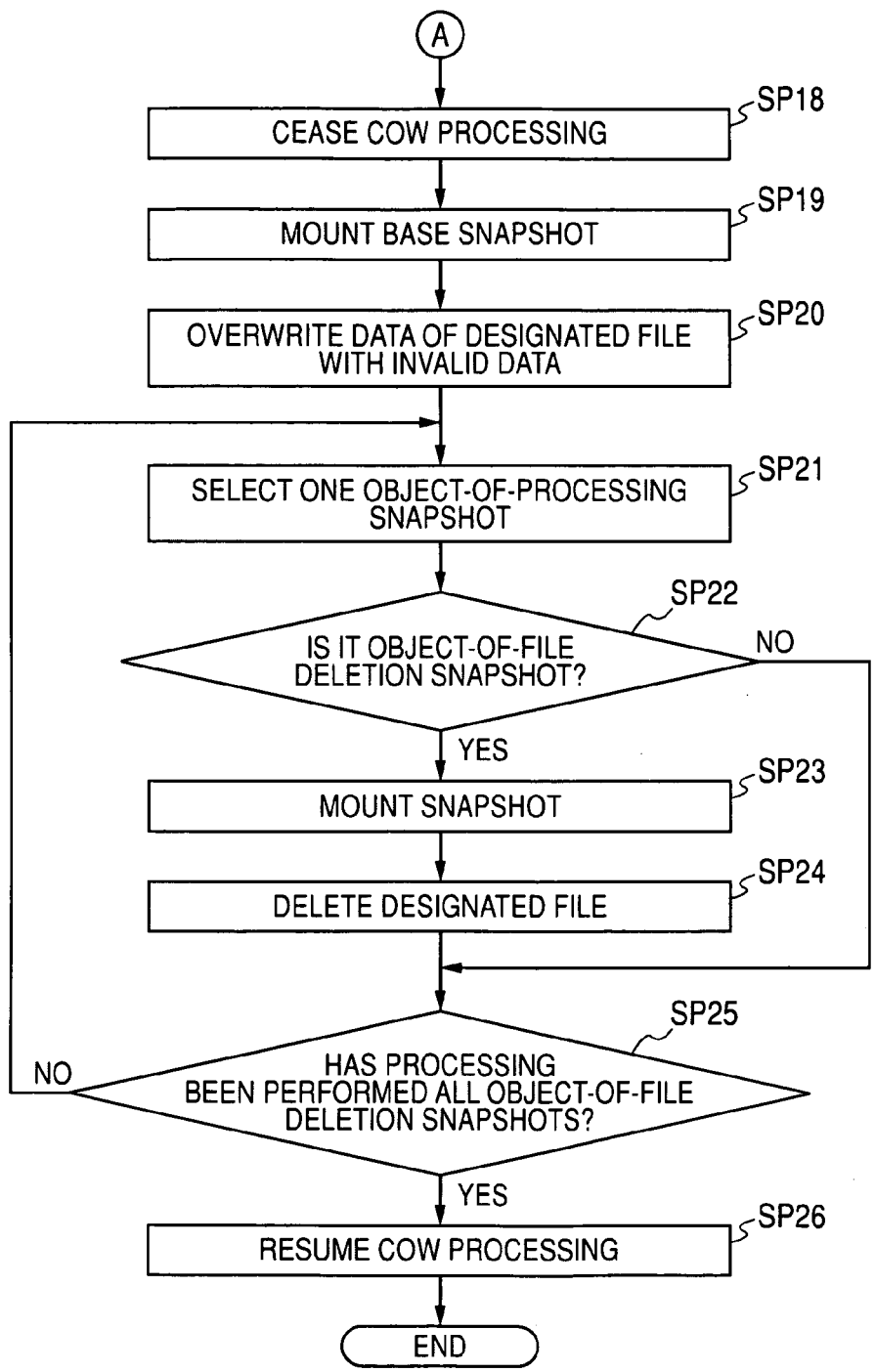
FIG. 9B is a flowchart describing the procedure of the second file deleting processing.

In the present embodiment, another method of file deleting processing is proposed for a snapshot facility that utilizes the COW technology. FIG. 9A and FIG. 9B describe a procedure employed in the file deleting processing method in accordance with the present embodiment to be adapted to the snapshot facility utilizing the COW technology. The control device 12 executes second file deleting processing mentioned in FIG. 9A and FIG. 9B according to a file full deletion program 24B employed in the second embodiment and stored in the memory 13 (FIG. 1).

Specifically, when any of the commands 70, 80, 90, and 100 described in conjunction with FIGS. 3C to 3F is issued from the management terminal 25, the control device 12 selects one file system or one snapshot from among snapshots and others, which are designated as snapshots and others from which a designated file should be deleted, out of a working file system and all relevant snapshots, and designates the file system or snapshot as a base snapshot (SP10).

As a method of selecting a base snapshot, a method of selecting the latest one from among snapshots selected as object-of-file deletion snapshots can be adopted. When the working file system is designated as the object-of-file deletion snapshot, if the working file system is designated as the base snapshot, an unused area in the difference volume obtainable at the completion of file deleting processing would increase.

Thereafter, the control device 12 selects one object-of-processing snapshot from among the working file system and all relevant snapshots (SP11). Thereafter, the control device 12 decides whether the object-of-processing snapshot has been selected as a snapshot from which a file that is an object of deletion (which shall be called a designated file) should be deleted (SP12). As a deciding method, the deciding method described as processing of step SP2 in FIG. 6 can be adopted.

If the control device 12 decides in the negative, the control device 12 proceeds to step SP17. If the control device 12 decides in the affirmative, the control device 12 decides whether the stored position of the data of the designated file in the object-of-processing snapshot is identical to the stored position of the data of the designated file in the base snapshot (SP13).

Referring to FIG. 7, for example, assume that the base snapshot is the working file system stored in the working volume 130, and the current object-of-processing snapshot is the snapshot 200805. In this case, the position of the data of the designated file specified in the metadata 140A in the working file system, and the position of the data of the designated file specified in the metadata 140B in the object-of-processing snapshot refer to the position of the data 141A stored in the working volume 130. Therefore, the control device 12 decides in the affirmative at step SP13. If the control device 12 decides in the affirmative at step SP13, the control device 12 proceeds to step SP17.

In contrast, referring to FIG. 7, for example, assume that the base snapshot is the working file system stored in the working volume 130 and the current object-of-processing snapshot is the snapshot 200804. In this case, the data of the designated file specified in the metadata 140A in the working file system is the data 141A stored in the working volume 130, and the data of the designated file specified in the metadata 140C in the object-of-processing snapshot is the data 141B stored in the difference volume 134. The control device 12 therefore decides in the negative at step SP13.

If the control device 12 decides in the negative at step SP13, the control device 12 checks the data of the designated file in the object-of-processing snapshot to see if the data is shared by any other relevant snapshot (SP14).

If the control device 12 decides in the affirmative, the control device 12 proceeds to step SP16. If the control device 12 decides in the negative, the control device 12 overwrites the data of the designated file in the object-of-processing snapshot with invalid data, and then collects the storage area, in which the data has been stored, as an unused area (SP15). Incidentally, as a standard rule concerning the contents of the invalid data with which the data of the designated file is overwritten or the number of times of overwriting, a rule recommended by the National Security Agency (NSA) or a provision stipulated by Pentagon (DoD5200.22-M) can be adopted.

Thereafter, the control device 12 changes the position of the data of the designated file specified in the metadata on the designated file in the object-of-processing snapshot into the position of the data of the designated file specified in the metadata on the designated file in the base snapshot (SP16).

Thereafter, the control device 12 decides whether the processing from step SP11 to step SP16 has been executed for the current file system and all relevant file systems (SP17).

If the control device 12 decides in the negative, the control device 12 returns to step SP11. Thereafter, the control device 12 repeats the same processing while changing the object-of-processing snapshot, which is selected at step SP11, to any other snapshot.

Through the foregoing processing, the position of the data of the designated file specified in the metadata on the designated file in each of object-of-file deletion snapshots is changed into the position of the data of the designated file specified in the metadata on the designated file in the base snapshot. Moreover, through the foregoing processing, the data items of the designated file other than the referencing destination specified in the metadata on the designated file in the base snapshot are deleted from the working volume 130 and difference volume 134.

If the control device 12 decides in the affirmative at step SP16 because it has completed performing the same processing on the current file system and all relevant file systems, the control device 12 ceases the COW processing (SP18). At this time, if the snapshot facility can cease the COW feature in units of a file, the control device 12 ceases the COW processing in relation to the designated file alone. If the snapshot facility cannot cease the COW processing in units of a file, the control device 12 does not receive a data access request from the host computers 2 until the COW processing is resumed at step SP26 that will be described later.

Thereafter, the control device 12 mounts the base snapshot designated at step SP10 (SP19), and then overwrites the data of the designated file in the base snapshot with invalid data (SP20). If the file system or snapshot facility has an interface through which the data of the designated file is overwritten, the processing of step SP19 may be excluded.

Thereafter, the control device 12 selects one object-of-processing file system from among a working file system and all relevant snapshots (SP21), and decides whether the object-of-processing snapshot has been selected as a snapshot from which the designated file should be deleted (SP22).

If the control device 12 decides in the negative at step SP22, the control device 12 proceeds to step SP25. If the control device 12 decides in the affirmative at step SP22, the control device 12 mounts the object-of-processing snapshot in the file system (SP23). If the object-of-processing snapshot is a current file system, this processing is skipped.

Thereafter, the control device 12 deletes the metadata on the designated file from the object-of-processing snapshot so as to delete the designated file from the object-of-processing snapshot (SP24). As a method of deleting metadata in this case, a method of overwriting the metadata with invalid data may be adopted.

Thereafter, the control device 12 decides whether the processing from step SP21 to step SP24 has been executed for the current file system and all relevant file systems (SP25).

If the control device 12 decides in the negative, the control device 12 returns to step SP21. Thereafter, the control device 12 repeats the same processing while changing the object-of-processing snapshot, which is selected at step SP21, to any other relevant snapshot. Through the foregoing processing, the metadata items on the designated file in all the object-of-file deletion snapshots are updated to the reference-disabled state.

If the control device 12 decides in the affirmative at step SP25 because it has completed performing the same processing on the current file system and all relevant file systems, the control device 12 resumes the COW processing (SP26). However, the processing of step SP26 is needed in a case where, as described in the patent document 1, the file system and snapshot facility are installed independently of each other but is not needed in a case where, as described in the patent document 2, the file system includes the snapshot facility. Thereafter, the control device 12 terminates the second file deleting processing.

Figure 10:
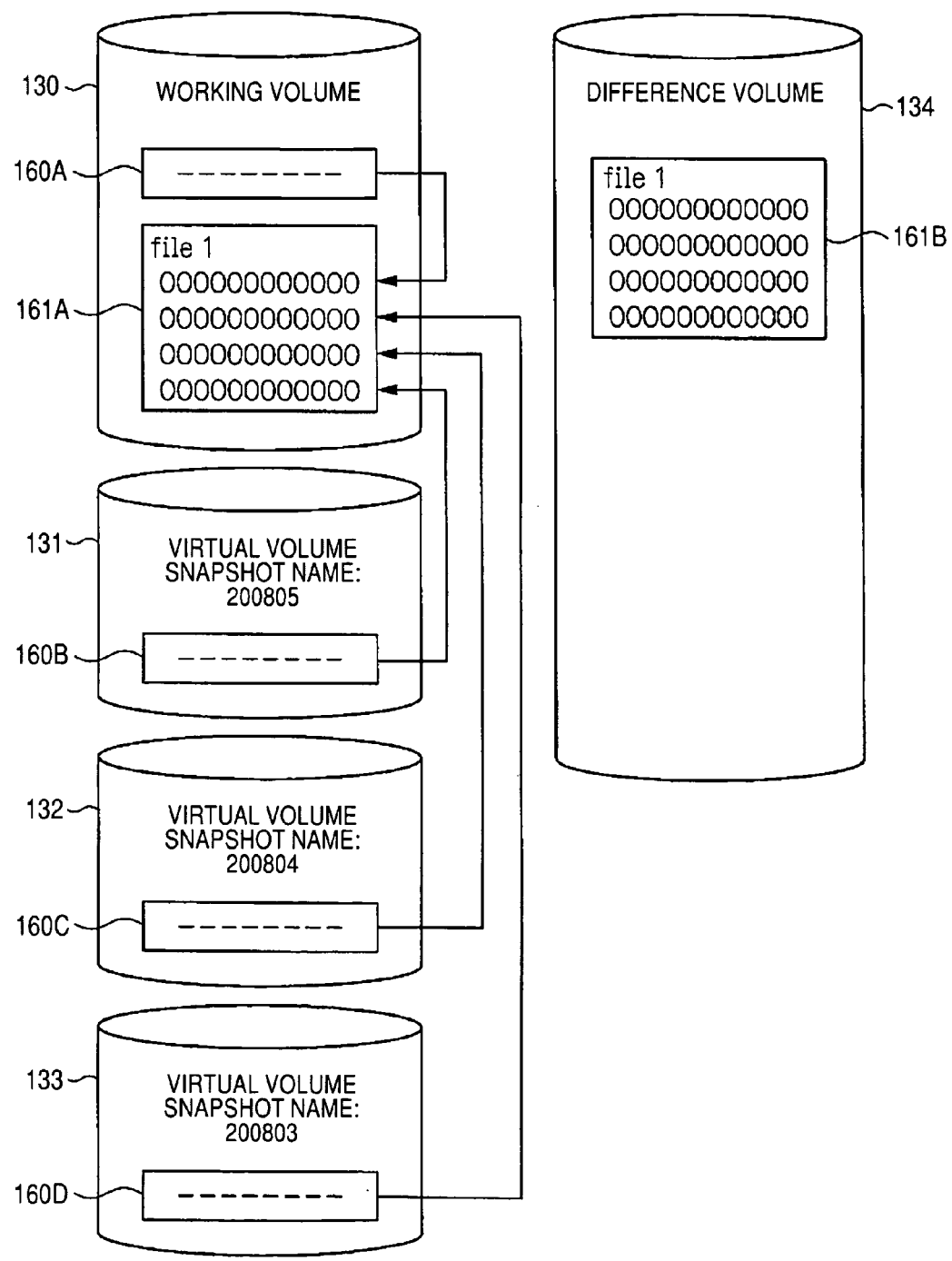
FIG. 10 is a conceptual diagram showing working examples of a file system and snapshots having undergone the second file deleting processing.

FIG. 10 shows an example of the results of processing obtained in a case where the file deleting processing described in conjunction with FIG. 9A and FIG. 9B is executed for practical examples of the working file system and all relevant snapshots described in conjunction with FIG. 7.

Assume that the control device 12 selects a working file system as a base snapshot at step SP10 in FIG. 9A.

If the snapshot 200805 is regarded as an object-of-processing snapshot, the referencing destination of a designated file specified in the metadata 140B (FIG. 7) in the object-of-processing snapshot is the same data 141A as the referencing destination of the designated file specified in the metadata 140A in the base snapshot (working file system) is. Consequently, the control device 12 decides in the affirmative at step SP13 in FIG. 9A, and does not execute the processing from step SP14 to step SP16.

If the snapshot 200804 is regarded as an object-of-processing snapshot, the referencing destination of a designated file specified in the metadata 140C in the object-of-processing snapshot is the same data 141A as the referencing destination of the designated file specified in the metadata 140A in the working file system is. Consequently, the control device 12 decides in the negative at step SP13 in FIG. 9A, and makes a decision at step SP14 in FIG. 9A.

Now, the referencing destination of the designated file specified in the metadata 140C in the object-of-processing snapshot (snapshot 200804), and the referencing destination of the designated file specified in the metadata 140D in the snapshot 200803 refer to the same data 141B saved into the difference volume 134. At this time, the control device 12 decides in the affirmative at step SP14 in FIG. 9A and does not execute step SP15. At step SP16, the control device 12 changes the referencing destination of the designated file specified in the metadata 140C from the data 141B saved into the difference volume 134 to the data 141A stored in the working volume 130.

Thereafter, if the snapshot 200803 is regarded as an object-of-processing snapshot, the referencing destination of a designated file specified in the metadata 140D in the object-of-processing snapshot is the data 141B different from the data 141A that is the referencing destination of the designated file specified in the metadata 140A in the working file system. Consequently, the control device 12 decides in the negative at step SP13, and makes a decision at step SP14.

In this case, since the referencing destination of the designated file specified in the metadata 140C in the snapshot 200803 has been changed from the data 141B in the difference volume 134 to the data 141A in the working volume 130, the data 141B that is the referencing destination of the designated file specified in the metadata 140D in the object-of-processing snapshot (snapshot 200803) does not square with the referencing destination of the designated file specified in the metadata items 140A to 140C in the other snapshots and working file system.

Therefore, the control device 12 overwrites the data 141B, which is the referencing destination of the designated file specified in the metadata 140D in the object-of-processing snapshot, with invalid data at step SP15 in FIG. 9A, and returns the storage area, in which the data 141B has been stored, to the snapshot facility as an unused area. Thereafter, at step SP16, the control device 12 changes the referencing destination of the designated file specified in the metadata 140D into the referencing destination (data 141A) of the designated file specified in the metadata 140A in the base snapshot (herein, the working file system). As a result, the data 141B stored in the difference volume 134 is, as shown in FIG. 10, not specified as the referencing destination of the designated file in any of the metadata items 140A to 140D, and is overwritten with invalid data.

Thereafter, at step SP18 in FIG. 9B, the control device 12 ceases the COW processing performed on the designated file (commands the snapshot facility to suspend the COW processing performed on the designated file). Further, the control device 12 mounts the working file system, which is selected as the base snapshot, at step SP19, and overwrites the data 141A, which is specified as the referencing destination of a file to be deleted in the metadata 140A in the working file system that is the base snapshot, with invalid data at step SP21. At this time, the data 141A is specified as the referencing destination of the designated file in the metadata items 140A to 140D contained in multiple snapshots. However, since the cease of the COW processing has been designated at step SP18, the data 141A is not saved. Consequently, the data 141A in the working volume 130 becomes as shown in FIG. 10 (data 161B) after undergoing the processing that ends at step SP20.

Thereafter, at step SP21 to step SP25, the control device 12 sequentially mounts object-of-file deletion snapshots, and sequentially updates the metadata items 140A to 140D contained in the object-of-file deletion snapshots to the reference-disabled state. After the processing ending at step SP25 is completed, the metadata items 140A to 140D in the object-of-file deletion snapshots enter, as shown in FIG. 10, the reference-disabled state (metadata items 160A to 160D). The control device 12 finally performs COW resuming processing at step SP26, and then terminates the file deleting processing.

As mentioned above, in the storage system 1 in accordance with the present embodiment, when a designated file is deleted from user-designated object-of-file deletion snapshots, the referencing destination specified in the metadata items 140A to 140D on the designated file contained in the respective object-of-file deletion snapshots is changed to the referencing destination specified in the metadata 140A in the base snapshot. Thereafter, the COW processing performed on the designated file is ceased, and the data 141A that is the referencing destination specified in the metadata 140A in the base snapshot is overwritten with invalid data. After the metadata items 140A to 140D on the designated file in the respective object-of-file deletion snapshots are updated to the reference-disabled state, the COW processing is resumed.

According to the foregoing file deleting processing employed in the present embodiment, as apparent from FIG. 10, the data of a designated file will not remain in the difference volume 134, but the storage area in which the data 161B in FIG. 10 is stored is returned to the snapshot facility (refer to step SP15 in FIG. 9A). Therefore, the difference volume 134 can be prevented from being wasted and storage resources can be utilized effectively.

Moreover, in the file deleting processing employed in the present embodiment, when the data 141A that is the referencing destination of a designated file specified in the metadata 140A in the base snapshot is overwritten with invalid data, the COW processing performed on the designated file is ceased. Therefore, the number of times by which file data is overwritten with invalid data can be minimized, and the time required for the file deleting processing can be shortened accordingly.

(3) Other Embodiments

The first and second embodiments have been described on the assumption that the present invention is applied to the computer 4 having the configuration shown in FIG. 1. The present invention is not limited to the computer but can be widely applied to various information processing systems having different configurations.

Moreover, the first and second embodiments have been described on the assumption that the snapshot creating unit that creates one snapshot or multiple snapshots which relate to the working volume 130 (working file system) and can be updated is realized with the control device 12 and snapshot management program 22. The present invention is not limited to the snapshot creating unit. Other various constructions can widely be adopted.

Further, the first and second embodiments have been described on the assumption that the file deleting unit which, in response to an externally issued designated file deletion command, deletes a designated file from all of the working volume 130 (working file system) and snapshots or part thereof specified in the deletion command is realized with the control device 12 and file full deletion program 24A or 24B. The present invention is not limited to the file deleting unit. Other various constructions can widely be adopted.

What is claimed is:

1. A file management system that is connected to a storage device and reads or writes data of a file from or in a first volume, which is provided by the storage device, in response to a request sent from a host computer, comprising:
   a snapshot creating unit that creates one snapshot or a plurality of snapshots which relates to the first volume and can be updated; and
   a file deleting unit that, in response to an externally issued designated file deletion command, deletes a designated file from all of the first volume and snapshots or part thereof specified in the deletion command, wherein:
   the file deleting unit overwrites the data items of the designated file in at least one of the first volume and the snapshots, from which the designated file should be deleted, with invalid data, and changes pieces of management information on the designated file into a reference-disabled state, wherein:

when a file shared by the first volume and snapshot or by the plurality of snapshots is updated, the snapshot creating unit executes copying processing of copying the data of the file, which is obtained prior to the updating, into a second volume provided by the storage device;

the file deleting unit changes the referencing destination of the designated file, which is specified in the management information on the designated file in the first volume or snapshot from which the designated file should be deleted, into the referencing destination of the designated file specified in the management information on the designated file in the first volume or snapshot designated as a base snapshot among at least one of the first volume and snapshots from which the designated file should be deleted, overwrites the referencing destination of the designated file, which is specified in the management information on the designated file in the at least one of the first volume and snapshot other than the base snapshot among the at least one of the first volume and snapshots from which the designated file should be deleted, with invalid data, and collects the storage area, in which the data of the designated file overwritten with the invalid data has been stored, as an unused area;

the file deleting unit controls the snapshot creating unit so that the copying processing will be ceased;

the file deleting unit overwrites the position of the data of the designated file, which is specified in the management information on the designated file in the first volume, with invalid data;

the file deleting unit deletes the pieces of management information on the designated file in the at least one of the first volume and snapshots from which the designated file should be deleted; and the file deleting unit controls the snapshot creating unit so that the copying processing will be resumed.

2. The file management system according to claim 1, wherein:

the deletion command includes a filename division in which the filename of a designated file is specified, and a command name division in which a command name instructing that the file should be deleted from the first volume and all the snapshots is specified; and when the deletion command is issued, the file deleting unit deletes the file, which has the filename thereof specified in the filename division of the deletion command, from all the first volume and snapshots.

3. The file management system according to claim 1, wherein:

the unit of data deletion is a file;

the deletion command includes a filename division in which the filename of a designated file is specified, an optional division in which identification information or pieces of identification information on one snapshot or a plurality of snapshots from which the designated file should be deleted are specified, and a command name division in which a command name instructing that the file having the filename thereof specified in the filename division should be deleted from all the snapshots which have the pieces of identification information thereon specified in the optional division; and when the deletion command is issued, the data deleting unit deletes the file, which has the filename thereof specified in the filename division of the deletion command, from all the snapshots which have the pieces of identification information thereon specified in the optional division.

4. A file management method for reading or writing data of a file from or in a first volume, which is provided by a storage device, in response to a request sent from a host computer, comprising:

a first step of creating one snapshot or a plurality of snapshots which relates to the first volume and can be updated;

a second step of, in response to an externally issued designated file deletion command, deleting a designated file from all of the first volume and snapshots or part thereof specified in the deletion command, wherein:

at the second step, data items of the designated file in at least one of the first volume and snapshots, from which the designated file should be deleted, are overwritten with invalid data, and pieces of management information on the designated file are changed to a reference-disabled state, wherein:

at the first step, when a file shared by the first volume and snapshot or by the plurality of snapshots is updated, copying processing of copying the data of the file, which is obtained prior to the updating, to the second volume provided by the storage device is executed; and at the second step:

the referencing destination of the designated file specified in the pieces of management information on the designated file in the at least one of the first volume and snapshots from which the designated file should be deleted is changed to the referencing destination of the designated file specified in the management information on the designated file in the first volume or snapshot, which is designated as a base snapshot, among the at least one of the first volume and snapshots from which the designated file should be deleted;

the referencing destination of the designated file specified in the management information on the designated file in the first volume and snapshot other than the base snapshot among the at least one of the first volume and snapshots from which the designated file should be deleted is overwritten with invalid data;

the storage area in which the data of the designated file overwritten with the invalid data has been stored is collected as an unused area;

the copying processing is ceased;

the position of the data of the designated file specified in the management information on the designated file in the base snapshot is overwritten with invalid data;

the pieces of management information on the designated data in the at least one of the first volume and snapshots from which the designated file should be deleted are deleted; and the copying processing is resumed.

5. The file management method according to claim 4, wherein:

the deletion command includes a filename division in which the filename of a designated file is specified, and a command name division in which a command name instructing that the designated file should be deleted from the first volume and all the snapshots is specified;

at the second step, when the deletion command is issued, the file having the filename thereof specified in the filename division of the deletion command is deleted from all of the first volume and snapshots.

6. The file management method according to claim 4, wherein:
the unit of data deletion is a file;
the deletion command includes a filename division in which the filename of a designated file is specified, an optional division in which identification information or pieces of identification information on one snapshot or a plurality of snapshots from which the designated file should be deleted are specified, and a command name division in which a command name instructing that the file having the filename thereof specified in the filename division should be deleted from all the snapshots which have the pieces of identification information thereon specified in the optional division; and
at the second step, when the deletion command is issued, the file having the filename thereof specified in the filename division of the deletion command is deleted from all the snapshots which have the pieces of identification information thereon specified in the optional division.

* * * * *